Patented Aug. 18, 1925.

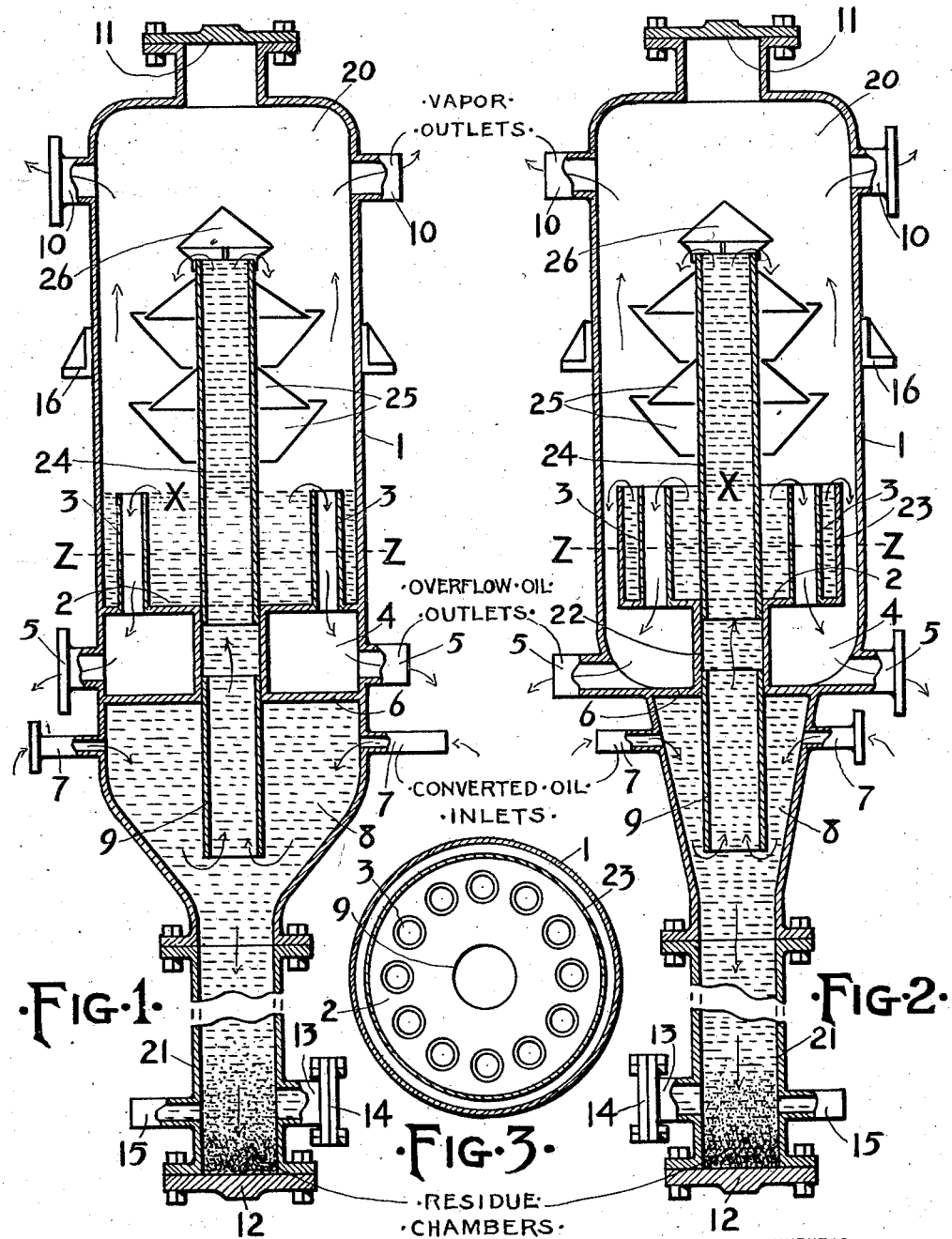

1,549,894

UNITED STATES PATENT OFFICE.

JOSEPH H. ADAMS, OF FLATBUSH, NEW YORK, ASSIGNOR TO THE TEXAS COMPANY, OF HOUSTON, TEXAS, A CORPORATION OF TEXAS.

OIL-CONVERTING-APPARATUS DOME.

Application filed February 27, 1920. Serial No. 361,665.

*To all whom it may concern:*

Be it known that I, JOSEPH H. ADAMS, a citizen of the United States, residing at Flatbush, in the county of Kings and State of New York, have invented a new and useful oil-converting-apparatus dome for oil-converting apparatus to be employed in connection with my various apparatus for the transformation of high-boiling hydrocarbons into lower-boiling products, of which the following is a specification.

This invention relates to a modified and improved form of oil converting apparatus dome, employed in connection with my apparatus for hydro-carbon oil conversion and is primarily used for the separation of lighter vapors of converted hydro-carbon oils from heavier vapors so that only lighter vapors will pass over into a condenser while the heavier partly or wholly unconverted vapors may be returned to the apparatus for re-conversion into those of a lighter and more desirable nature.

Another feature of this separating dome is to collect and precipitate any finely divided particles of carbon or coke which may be carried in suspension in liquid oil during its course through the tubes, chambers or vessels of oil converting apparatus shown and described in my Patent No. 1,320,354 granted October 28, 1919, Patent No. 1,327,263 granted January 6, 1920, Patent No. 1,320,726 granted November 4, 1919, and Patent No. 1,320,727 granted November 4, 1919.

In the continuous process of oil conversion, as described in my patents above referred to, a certain portion of carbon or coke and other residues must necessarily be formed during the process. This carbon in the form of finely divided particles is carried along with the liquid part of the oil when in more or less rapid transit through the system, and lodges wherever the slow velocity of the continuously flowing oil will permit; and unless provision is made for its accumulation outside the heating zone, it would soon clog up the system and render it inoperative.

In order to obviate this possible interruption and avoid the accumulation of carbon and other sediment in the active part of the system and particularly in the cracking tubes and chambers, it is desirable to arrange heavy bottoms chambers, carbon traps and other essential receptacles at certain advantageous places in an oil converting system so that the gradually accumulating mass of carbon can be trapped and periodically removed from the system.

Apart from the provisions made in the various types of apparatus described in my patents heretofore referred to, I have designed a separating dome adapted to divide lighter from heavier vapors in the upper part of said dome and in the lower part, where the oil flows in from the converters, a carbon trapping system is arranged to throw down the carbon by a centrifugal action of the oil in its siphon-like passage from the inlets downwardly into the lower part of the separator then upwardly in its passage to the vapor and oil separating space.

The dome is placed in the piping system between the converter and the condenser, as shown in the drawings of my Patents Nos. 1,320,726 and 1,320,727, so that any heavier fractions carried over with the lighter converted vapors will be separated out and not permitted to go through the condenser.

In the economical operation of my oil converting processes, it is desirable to eliminate the passage of heavier vapors through the condenser so that the distillates collected from the foot of or beyond the condenser will not necessarily require fractional distillation to separate the lighter from the heavier products.

By the interposition of this dome between the converter and condenser it is possible to carry on such a perfect separation of the lighter and heavier vapors that the product of the condenser will contain but a very small percentage of undesirable lower gravity oils, if any, since the object of the dome is to so perfectly separate the lighter desirable vapors as to insure that practically all of the product of the condenser is of the particular grade of oil or oily spirits desired.

In order to more fully disclose this invention to those skilled in the art of oil conversion, drawings of the principal parts thereof have been appended and in such drawings like characters of reference denote corresponding parts throughout the several views of which;

Figure 1, is a vertical sectional view in elevation of a separating dome embodying the several features hereinafter to be described.

Figure 2, is a vertical sectional view in elevation of a similar separating dome differing in some minor details from Fig. 1, and Figure 3, is a cross sectional view taken through line Z—Z of Figs. 1 and 2, and which shows the circumferentially arranged series of stand or overflow pipes.

This improved separating dome is based upon my former inventions, and is an improvement over the forms of dome described and shown particularly in Patents Nos. 1,327,263, 1,320,726 and 1,320,727.

Referring now to Fig. 1, in the construction of this dome the casing or shell 1, is of steel or other strong metal capable of withstanding a pressure of several hundred pounds to the square inch and a temperature from 500 to 1000° F.

A false bottom or diaphragm 2, is attached to the shell 1, and is perforated with a number of holes into which short stand pipes 3, are screwed or headed. Below this bottom a well 4, is arranged to catch the overflow hot oil from standpipes 3, and which oil is led out through pipes 5. Arranged below this well 4, another false bottom 6, is made fast to the shell 1, and which constitutes the dividing line between the incoming liquid oil through pipes 7 into the cistern 8, and the upper part or vapor space 20, of the liquid and vapor separating dome.

Extending down from the centre of the false bottom 6, a pipe or sheath 9, of the proper length is positioned in such a manner as to require the incoming oil to flow downwardly in the cistern 8, before rising through this pipe or sheath 9, up and into the liquid and vapor separating compartment 20, of the dome.

Above the false bottom 2, a stand pipe 24 with spreaders and collecting funnels 25, can be arranged for the more or less complete separation of the lighter vapors from incoming converted oil; and since there are several practical forms of these spreaders in use and various ways of deflecting and collecting the liquid while passing over them, this feature is shown only as an adjunct, in dotted lines on the drawings, as typifying one of many suitable forms of spreaders and to which specifically I do not herein make any claim.

At the upper part of the dome, and as an outlet from the vapor space 20, one or more pipes 10, are arranged to lead vapors out and to the condensers, while at the extreme top of the dome a man-hole and cap plate 11, is provided for interior inspection of the vapor space 20 and spreaders, when necessary.

At the lower end of the cistern 8, a bottom plate or cap 12, is made fast to close the dome, and at the side, and a short distance above the bottom, a clean-out hand hole 13, with a removable plate 14, is provided for removing carbon and residues from the bottom of the cistern 8. Another outlet or pipe 15, is arranged at the lower end of the cistern also, in order to drain the separator and cistern of oil before opening the clean-out ports.

All of the inlet and outlet pipes are, of course, connected into other parts of a system or they are provided with valves, and in order to support the dome, lugs or brackets 16 are made fast to the shell.

The shape and size of the cistern 8, can be varied in diameter and length to meet manufacturing conditions but for the continuous operation of a tubular apparatus where the oil is being forced through at a comparatively high velocity it is well to have large residue cisterns so that the particles of carbon will not be carried up with liquid oil into the liquid and vapor separating part 20, of the dome, through pipe 9, or by any other means lodged above the false bottom or diaphragm 2.

When properly set in the piping system of an oil converting apparatus, this dome separator will operate in a very satisfactory manner in separating the principal products of conversion, that is, the converted vapors from the heavier vapors and unconverted oils, the carbon and other residues held in suspension from the unconverted oils, while the fixed gases generated during the process will pass off with the vapors to and through the condenser and be collected at the foot of or beyond the condenser.

In effect, the hot liquid oil passing more or less rapidly through the converting system will flow into the dome through pipes 7, and for a short time will be in a more or less quiescent state in the cistern 8, where the rapid flow of oil through small pipes will be arrested temporarily in the larger body of contained oil. While in this temporarily quiescent state the finely divided particles of carbon will precipitate through the hot and light gravity oil towards the heavy bottoms chamber 21, located below the cistern 8; and since the oil in its slightly centrifugal action down and around the lower edge of and up through pipe 9, has a tendency to throw down its free carbon held in suspension, the oil rising in pipe 9 will be more or less freed from much of the carbon forced into the cistern with it through pipes 7.

While and during the time the oil is rising to and above the false bottom 2, and up to the surface level X, before overflowing the tubes 3 and running into the well 4, a considerable quantity or all of the remaining carbon particles held in suspension will have time to precipitate out from the mass of oil contained above the false bottom 2, so that the oil overflowing the pipes 3 into the well 4 and out through pipes 5, will be generally free from any carbon that would be at all bothersome in the train of piping leading back to the converting system for the return and re-treatment of the unconverted fractions of oil.

If the stand pipe 24 and spreaders 25, as suggested, are employed, the lighter vapors separated from the heavier and the oil carrying them will pass to the condenser through pipes 10, while the heavier vapors and such oil as may be mechanically carried over will flow downwardly and over the separator sheds and reach the liquid level X, where it overflows the top of the stand pipes 3, and will then be conducted from well 4 through the pipes 5 to the system for re-treatment.

The sheds or spreaders 25, are made fast to the stand pipe 24, as indicated, and at the upper edges the spreaders are perforated so that vapors caught underneath can rise while the oil is flowing over them and pass to pipes 10 to be conducted off with other light vapors.

The conical cap 26, shown at the top of the stand pipe 24, is attached in such a manner that oil or vapor suddenly spurted through the pipe 24, will be projected against the under side of the cap and caught before it can be driven over through pipes 10.

In the drawing Fig. 2, the false bottom 2, is really the bottom of a cylindrical receptacle and is supported on a stand pipe 22, which rises from the false bottom 6. This bottom or diaphragm is provided with a cylindrical open top shell or band 23, made fast to its outer edge and standing in the holes made in the bottom plate or diaphragm 2, are a number of overflow pipes 3, made fast as heretofore described.

The top edge of the cylindrical side forming the receptacle is on a level with the tops of all of the stand pipes 3, so that oil which rises through pipe 9 into the receptacle may overflow both the tubes and the side of the oil containing receptacle at the same time and flow down into the well 4 to be conducted out through the pipes 5, and be returned to the system again for re-treatment.

In operation, oil and oily vapors held under super-atmospheric vapor pressure in the tubular converting apparatus and which are delivered into the dome through pipes 7, are in such a compact mass, due to the heavy pressure they are subjected to in transit, that they necessarily have to pass into a larger chamber or expansion receptacle such as this dome before the vapors have a chance to expand and free themselves from heavier vapors and oils with which they have been combined during conversion within the confined tubular chambers.

The rapid transit passage of oil through the system of pipes of restricted cross sectional area, while held under a pressure of several atmospheres has made it impossible for the vapors to become detached or separated from the liquid oil and not until an expansion chamber or dome is reached have the vapors a chance to become in any way segregated from the body of oil within which they have been forced along during the cracking operation.

The stand pipes 3, arranged as shown in the false bottom or diaphragm 2, take care of the overflowing oil and the area of a number of pipes arranged in circumferential order, as shown in Fig. 3, provides ample volatilizing space while the oil is overflowing and dropping into the well 4; and any lighter vapors passing off from the overflow oil and from that collected in the well, will pass up through the pipes 3 and into the vapor space 20, where a further separation of lighter from heavier vapors takes place before the lightest desirable vapors pass out through pipes 10 to the condensers.

Having described my invention, what I claim as new and desire to secure by Letters Patent is:

1. A device of the nature disclosed comprising a dome provided with a lower liquid cistern, an upper vapor space and an intermediate overflow chamber, communicating connections between the lower liquid cistern and the vapor space and also between the vapor space and said overflow chamber, an inlet for supplying oil to said liquid cistern from whence it passes upwardly into said vapor space and thence downwardly into said overflow chamber, an outlet to carry off the vapors separated from the oil in said vapor space, an outlet for removing the oil from said overflow chamber, and a chamber below and in communication with said liquid cistern for receiving the residue settling out of the oil therein.

2. A device of the nature disclosed comprising a dome provided with a lower liquid cistern, an upper vapor space and an intermediate overflow chamber, an inlet for oil in said lower cistern, a pipe-like connection between said cistern and said vapor space for conducting the oil upwardly to said vapor space, overflow pipes communicating with said overflow chamber and projecting upwardly into said vapor space for conducting the oil downwardly into said overflow chamber where it is discharged, a vapor outlet for carrying off the vapors separated from the oil in said vapor space, and a chamber below and communicating directly with said liquid cistern for receiving the residue settling out of the oil therein.

3. A device of the nature disclosed comprising a dome provided with a lower liquid cistern having an oil inlet and upper vapor space having a vapor outlet and an intermediate overflow chamber having a discharge outlet, a centrally disposed pipe-like connection establishing communication and conducting oil between said cistern and said vapor space and passing through said intermediate overflow chamber, a series of overflow pipes projecting upwardly from said overflow chamber into said vapor space for determining the height of oil therein and conducting the excess oil into said overflow chamber where it is discharged, and a chamber below said liquid cistern for receiving the residue settling from the oil therein.

4. A device of the nature disclosed comprising a dome provided with a lower liquid cistern having an oil inlet for the introduction of oil under pressure therein, an upper vapor space having a vapor outlet, and an intermediate overflow chamber having a discharge outlet, a centrally disposed pipe-like connection extending downwardly into said cistern to a point materially below said oil inlet wherein the oil is forced and upwardly to a considerable height in said vapor space for facilitating the separation of residue in said cistern and for conducting oil from said cistern to said vapor space, a plurality of overflow pipes projecting upwardly from said overflow chamber into said vapor space to a height less than that of the central pipe-like connection and adapted to conduct the excess oil into said overflow chamber for discharge, and an elongated chamber connected to the bottom of said cistern for receiving the residue separated from the oil therein.

5. A device of the nature disclosed comprising a dome provided with an upper vapor space having a vapor outlet, a lower liquid cistern having an oil inlet and an intermediate overflow chamber having a discharge outlet, a centrally disposed pipe-like connection passing through said overflow chamber and providing an open communication from said cistern to said vapor space, said pipe-like connection extending downwardly substantially to the bottom of said cistern and materially below said oil inlet, and means communicating between said vapor space and said overflow chamber for establishing a predetermined oil level in said vapor space and conducting the excess oil into said overflow chamber where it is discharged.

6. A device of the nature disclosed comprising a dome provided with an upper vapor space having a vapor outlet, a lower liquid cistern having an oil inlet and an intermediate overflow chamber having a discharge outlet, a centrally disposed pipe-like connection extending from substantially the bottom of said cistern to a considerable height in said vapor space, means within said vapor space and carried by said pipe-like connection for spreading or distributing the oil conducted upwardly through said pipe-like connection, a series of circularly arranged overflow pipes communicating with said overflow chamber and projecting upwardly into said vapor space to a height below said spreading means whereby a predetermined oil level is established and the excess oil is conducted into said overflow chamber for discharge, a chamber below said cistern for receiving the residue settling from the oil therein, and means for drawing off the residue from said residue chamber.

7. A device of the nature disclosed comprising a dome provided with a lower liquid cistern, provided at its upper end with an oil inlet through which oil is forcibly introduced, an upper vapor chamber having a vapor outlet therein, a pipe-like connection between said cistern and said vapor chamber for conducting oil upwardly into the vapor chamber, said pipe-like connection projecting downwardly adjacent the bottom of said cistern and a material distance below the oil inlet to facilitate the separation of heavy residue as the oil passes over the edge of said connection and rises therethrough, means for conducting off the liquid oil from said vapor chamber and a residue chamber below said cistern for receiving the residue settling out of the oil therein.

In testimony whereof I affix my signature.

JOSEPH H. ADAMS.